US012608619B2

(12) United States Patent
Arnon et al.

(10) Patent No.: US 12,608,619 B2
(45) Date of Patent: Apr. 21, 2026

(54) SUPERSEDED FEDERATED LEARNING

(71) Applicant: Dell Products L.P., Round Rock, TX (US)

(72) Inventors: Ohad Arnon, Beit-Nir (IL); Dany Shapiro, Alfei Menashe (IL)

(73) Assignee: Dell Products L.P., Round Rock, TX (US)

( * ) Notice: Subject to any disclaimer, the term of this patent is extended or adjusted under 35 U.S.C. 154(b) by 1057 days.

(21) Appl. No.: 17/559,159

(22) Filed: Dec. 22, 2021

(65) Prior Publication Data

US 2023/0196115 A1      Jun. 22, 2023

(51) Int. Cl.
| | |
|---|---|
| *G06N 3/088* | (2023.01) |
| *G06N 3/044* | (2023.01) |
| *G06N 3/045* | (2023.01) |
| *G06N 3/047* | (2023.01) |
| *G06N 3/08* | (2023.01) |
| *G06N 20/20* | (2019.01) |

(52) U.S. Cl.
CPC ............. *G06N 3/088* (2013.01); *G06N 3/045* (2023.01)

(58) Field of Classification Search
CPC ....... G06N 3/098; G06N 3/045; G06N 3/0475
See application file for complete search history.

(56) References Cited

U.S. PATENT DOCUMENTS

| | | | | |
|---|---|---|---|---|
| 2022/0058494 A1* | 2/2022 | Wu | ........................ | G06N 3/098 |
| 2022/0398343 A1* | 12/2022 | Ou | ........................ | G06N 20/00 |

FOREIGN PATENT DOCUMENTS

| | | | | |
|---|---|---|---|---|
| CN | 113468521 A | * 10/2021 | ............. | G06N 3/043 |

OTHER PUBLICATIONS

Mendes, Andre et al.; "Unified Multi-Domain Learning and Data Imputation using Adversarial Autoencoder"; Mar. 2020; arXiv; 1-8 (Year: 2020).*

Lu, Linpeng et al.; "Multi-Party Private Set Intersection in Vertical Federated Learning"; 2020; IEEE 19th International Conference on Trust, Security, and Privacy in Computing and Communications; 707-714 (Year: 2020).*

Ou, Wei et al.; "A Homomorphic-encryption-based Vertical Federated Learning Scheme for Rick Management"; 2020; Computer Science and Information Systems 17(3); 819-834 (Year: 2020).*

Lu, Yunlong; "Blockchain and Federated Learning for Privacy-Preserved Data Sharing in Industrial IoT"; Jun. 2020; IEEE Transactions on Industrial Informatics vol. 15 No. 6; (Year: 2020).*

(Continued)

*Primary Examiner* — Van C Mang
*Assistant Examiner* — Ezra J Baker
(74) *Attorney, Agent, or Firm* — Chamberlain, Hrdlicka, White, Williams & Aughtry; Aly Z. Dossa

(57) ABSTRACT

A method and system for implementing superseded federated learning. Superseded federated learning may entail a novel, performance-efficient federated learning technique designed to further decouple multiparty dependency on one another, as well as any third-parties, while collaborating in multiparty computations. Specifically, unlike any current federated learning methodology, superseded federated learning eliminates the complex and often inefficient coordination amongst parties, as well as removes third-party participation, during the classification or prediction inference phase of multiparty collaborations.

11 Claims, 6 Drawing Sheets

(56)                References Cited

OTHER PUBLICATIONS

Li, Rui et al.; "Generating Target Image-Label Pairs for Unsupervised Domain Adaptation"; Jul. 2020; IEEE Transactions on Image Processing vol. 29; 7997-8011 (Year: 2020).*

Chang, Qi et al.; "Synthetic Learning: Learn From Distributed Asynchronized Discriminator GAN Without Sharing Medical Image Data"; Jun. 2020; arXiv; 1-15 (Year: 2020).*

Website entitled "Building Your Own Federated Learning Algorithm"; Aug. 2021; TensorFlow; Retrieved from Internet: <https://www.tensorflow.org/federated/tutorials/building_your_own_federated_learning_algorithm> (Year: 2021).*

Goetz, Jack et al.; "Federated Learning via Synthetic Data"; Sep. 2020; arXiv; 1-12 (Year: 2020).*

Angelou, Nick et al.; "Asymmetric Private Set Intersection with Applications to Contact Tracing and Private Vertical Federated Machine Learning"; Nov. 2020; arXiv; 1-10 (Year: 2020).*

Xin, Bangzhou et al.; "Private FL-GAN: Differential Privacy Synthetic Data Generation Based on Federated Learning"; 2020; IEEE ICASSP 2020; 2927-2931 (Year: 2927).*

Lin, Tao et al.; Ensemble Distillation for Robust Model Fusion in Federated Learning; Mar. 2021; arXiv; 1-26 (Year: 2021).*

Bouacida, N. & Mohapatra, P. "Vulnerabilities in Federated Learning." IEEE Access, vol. 9, 2021, pp. 63229-63249. (Mar. 16, 2021) (21 pages).

Jatain, D., Singh, V. & Daihiya, N. "A contemplative perspective on federated machine learning: Taxonomy, threats & vulnerability assessment and challenges." Journal of King Saud University—Computer and Information Sciences (Mar. 16, 2021 (18 pages).

Kairouz, P., et al. "Advances and Open Problems in Federated Learning." Foundations and Trends in Machine Learning, vol. 14, Issue 1-2, 2021, (122 pages).

Li, T., Sahu, A. K., Talwalkar, A. & Smith, V. "Federated Learning: Challenges, Methods, and Future Directions." IEEE Signal Processing Magazine, vol. 37, 2020, (21 pages).

Ma, J., Naas, S. A., Sigg, S. & Lyu, X. "Privacy-preserving Federated Learning based on Multi-key Homomorphic Encryption." ArXiv:2104.06824, 2021. (16 pages).

Ogburn, M., Turner, C. & Dahal, P. "Homomorphic Encryption." Procedia Computer Science, vol. 20, 2013, pp. 502-509. (8 pages).

Yang, Q., Liu, Y., Chen, T. & Tong, Y. "Federated Machine Learning: Concept and Applications." ACM Transactions on Intelligent Systems and Technology (TIST), vol. 10, Issue 2, 2019, pp. 1-19. (20 pages).

* cited by examiner

600
Computing
System

608
Output Device(s)

604
Non-Persistent
Storage

602
Computer
Processor(s)

606
Persistent
Storage

612
Communication
Interface

610
Input Device(s)

SUPERSEDED FEDERATED LEARNING

BACKGROUND

Through the framework of federated learning, a network-shared machine learning model may be trained using decentralized data stored on various devices, in contrast to the traditional methodology of using centralized data maintained on a single, central device. Current federated learning architectures, however, require often complex and performance-inefficient multiparty computation techniques.

SUMMARY

In general, in one aspect, the invention relates to a method for inferring outcomes using superseded federated learning. The method includes obtaining a new sample; processing the new sample to obtain a local model outcome; deriving a remote generator model input data set from the new sample; processing the remote generator model input data set to obtain at least one synthesized remote learning model input data set; processing the at least one synthesized remote learning model input data set to obtain at least one remote model outcome; and aggregating the local model outcome and the at least one remote model outcome to produce an aggregated outcome.

In general, in one aspect, the invention relates to a non-transitory computer readable medium (CRM). The non-transitory CRM includes computer readable program code, which when executed by a computer processor, enables the computer processor to perform a method for inferring outcomes using superseded federated learning. The method includes obtaining a new sample; processing the new sample to obtain a local model outcome; deriving a remote generator model input data set from the new sample; processing the remote generator model input data set to obtain at least one synthesized remote learning model input data set; processing the at least one synthesized remote learning model input data set to obtain at least one remote model outcome; and aggregating the local model outcome and the at least one remote model outcome to produce an aggregated outcome.

In general, in one aspect, the invention relates to a system. The system includes a plurality of nodes operatively connected to one another through a network, wherein each node of the plurality of nodes includes a computer processor configured to perform a method for inferring outcomes using superseded federated learning. The method includes obtaining a new sample; processing the new sample to obtain a local model outcome; deriving a remote generator model input data set from the new sample; processing the remote generator model input data set to obtain at least one synthesized remote learning model input data set; processing the at least one synthesized remote learning model input data set to obtain at least one remote model outcome; and aggregating the local model outcome and the at least one remote model outcome to produce an aggregated outcome.

Other aspects of the invention will be apparent from the following description and the appended claims.

DETAILED DESCRIPTION

Figure 1:
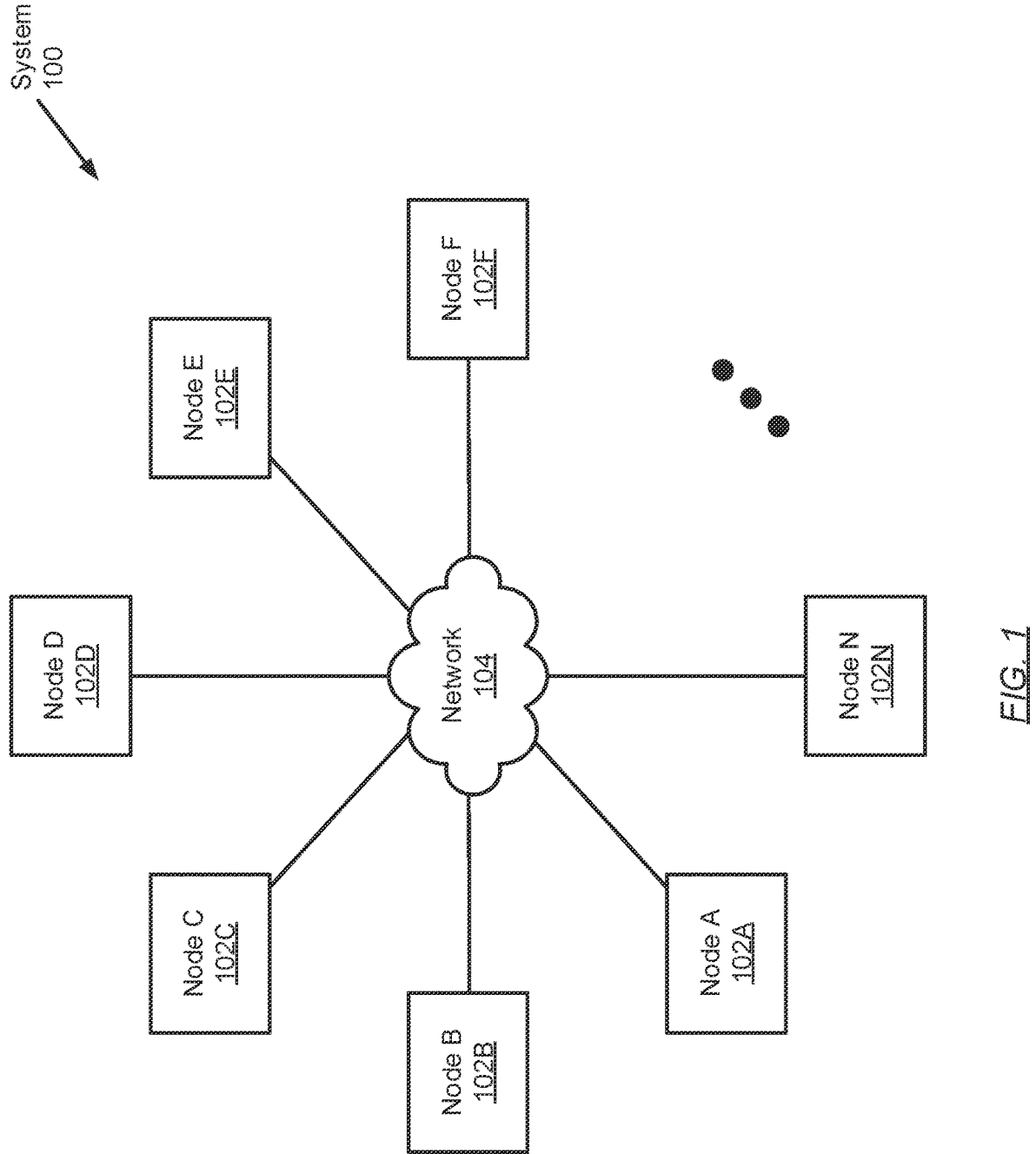
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to superseded federated learning. Superseded federated learning may entail a novel, performance-efficient federated learning technique designed to further decouple multiparty dependency on one another, as well as any third-parties, while collaborating in multiparty computations. Specifically, unlike any current federated learning methodology, superseded federated learning supersedes, or enhances, traditional federated learning techniques by eliminating the complex and often inefficient coordination amongst parties, as well as removing third-party participation, during the classification or prediction inference phase of multiparty collaborations.

Federated learning (also known as collaborative learning) may refer to the optimization (i.e., training and/or validation) of machine learning models using decentralized data. In traditional machine learning methodologies, the training and/or validation data, pertinent for optimizing learning models, are often stored centrally on a single device, data center, or the cloud. Through federated learning, however, the training and/or validation data may be stored across various devices (for data privacy concerns)—with each device performing a local optimization of a shared learning model using their respective local data. Updates to the shared learning model, derived differently on each device based on different local data, may subsequently be forwarded to a federated learning coordinator (or third-party), which aggregates and applies the updates to improve the shared learning model.

FIG. 1 shows a system in accordance with one or more embodiments of the invention. The system (100) may represent enterprise information technology (IT) infrastructure belonging to one or many industries, sectors, or domains. Each enterprise IT infrastructure may entail composite hardware, software, and network resources, as well as services, directed to the implementation, operation, and management thereof. The system (100) may include, but is not limited to, a collection of (i.e., at least two) nodes (102A-102N) operatively connected to one another through a network (104). Each of these system (100) components is described below.

In one embodiment of the invention, a node (102A-102N) may represent any physical appliance or computing system configured to receive, generate, process, store, and/or transmit data, as well as to provide an environment in which one or more computer programs may execute thereon. The computer program(s) may, for example, implement large-scale and complex data processing; or implement one or more services offered locally or over the network (104). Further, any subset of the computer program(s) may employ or invoke machine learning and/or artificial intelligence to perform their respective functions and, accordingly, may participate in superseded federated learning (as described herein). In providing an execution environment for the computer program(s) installed thereon, a node (102A-102N) may include and allocate various resources (e.g., computer processors, memory, storage, virtualization, networking, etc.), as needed, to the computer program(s) and the tasks instantiated thereby. One of ordinary skill will appreciate that a node (102A-102N) may perform other functionalities without departing from the scope of the invention. Examples of a node (102A-102N) may include, but are not limited to, a desktop computer, a workstation computer, a network server, a mainframe, a mobile device, or any other computing system similar to the exemplary computing system shown in FIG. 6. Nodes (102A-102N) are described in further detail below with respect to FIG. 2.

In one embodiment of the invention, the above-mentioned system (100) components may operatively connect to one another through the network (104) (e.g., a local area network (LAN), a wide area network (WAN) such as the Internet, a mobile network, any other network type, or a combination thereof). The network (104) may be implemented using any combination of wired and/or wireless connections. Further, the network (104) may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

While FIG. 1 shows a configuration of components, other system (100) configurations may be used without departing from the scope of the invention.

Figure 2:
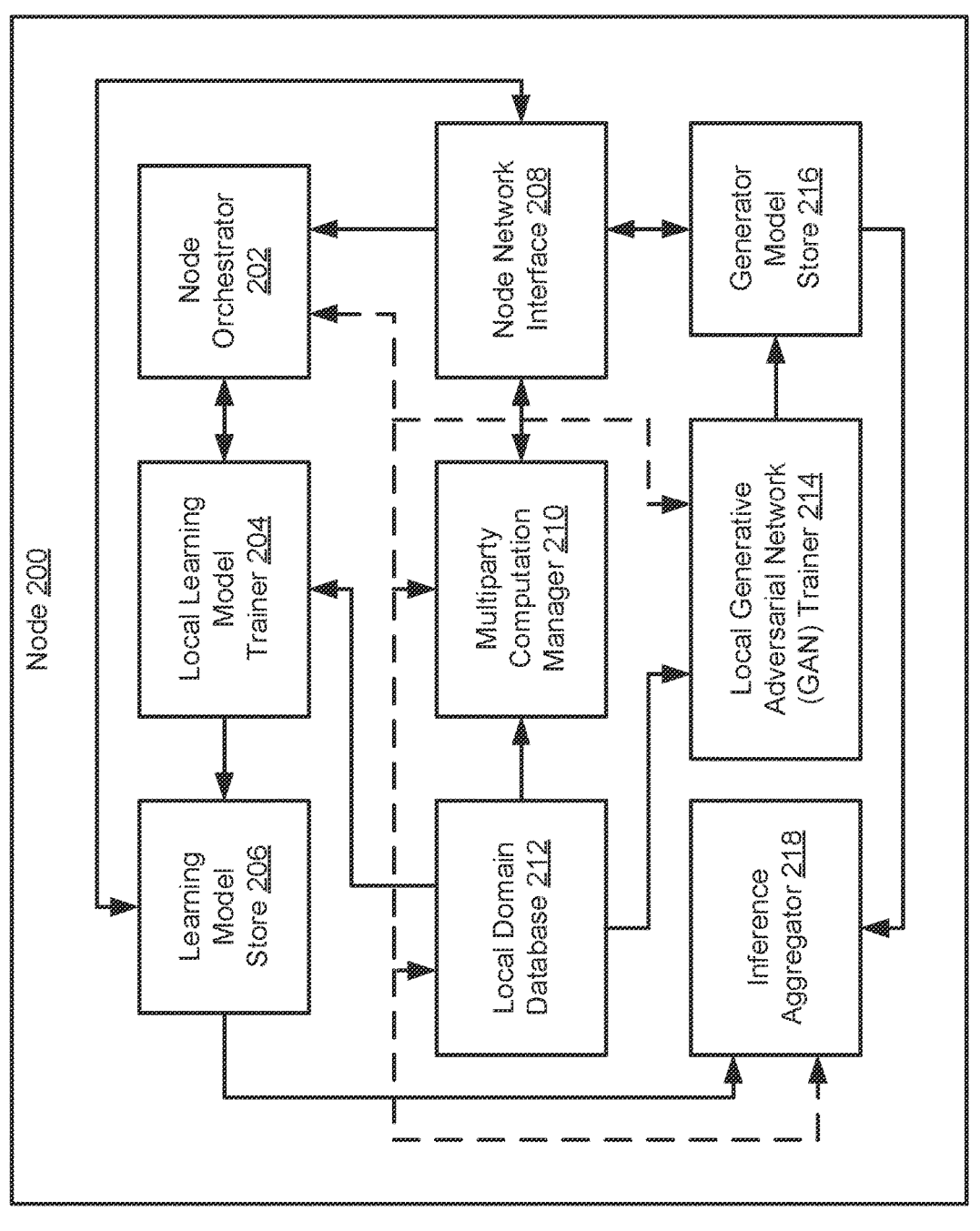
FIG. 2 shows a node in accordance with one or more embodiments of the invention.

FIG. 2 shows a node in accordance with one or more embodiments of the invention. A node (200) may include, but is not limited to, a node orchestrator (202), a local learning model trainer (204), a learning model store (206), a node network interface (208), a multiparty computation manager (210), a local domain database (212), a local generative adversarial network (GAN) trainer (214), a generator model store (216), and an inference aggregator (218). Each of these node (200) subcomponents is described below.

In one embodiment of the invention, the node orchestrator (202) may refer to a computer program that may execute on the underlying hardware of a node (200), which may be responsible for coordinating the implementation of superseded federated learning by the node (200). Implementation of superseded federated learning may entail a training phase and an inference phase.

In one embodiment of the invention, in association with the training phase, the node orchestrator (202) may include functionality to: instruct the multiparty computation manager (210) to identify features and sample identifiers (IDs) within local domain data (see e.g., FIG. 3) (maintained in the local domain database (212)) that may be shared or common across other remote data domains (i.e., other remote nodes); obtain the common features and the common sample IDs identified by the multiparty computation manager (210); provide the obtained common sample IDs to the local learning model trainer (204); instruct the local learning model trainer (204) to initialize/train a local learning model using a local domain data subset (maintained in the local domain database (212)) mapped to the provided common sample IDs; provide the obtained common features to the local GAN trainer (214); instruct the local GAN trainer (214) to initialize/train a local GAN using at least the provided common features; instruct the node network interface (208) to share or disseminate a trained local learning model and a trained local generator model to one or more remote nodes; and configure the inference aggregator (218).

In one embodiment of the invention, in association with the inference phase, the node orchestrator (202) may include functionality to: obtain new local domain data or sample(s); provide the obtained new local domain data to the inference aggregator (218) for processing; and following said processing, obtain an aggregated prediction (or classification), pertinent to a problem statement, from the inference aggregator (218). Further, one of ordinary skill will appreciate that the node orchestrator (202) may perform other functionalities without departing from the scope of the invention.

In one embodiment of the invention, the local learning model trainer (204) may refer to a computer program that may execute on the underlying hardware of a node (200), which may be responsible for configuring local learning models (described below). To that extent, the local learning model trainer (204) may include functionality to: receive a set of common sample IDs from the node orchestrator (202); retrieve a local domain data subset (maintained in the local domain database (212)) mapped to the received set of common sample IDs (i.e., a local learning model training data set); initialize/train a local learning model using the local learning model training data set; following said training, produce a trained local learning model; and maintain the trained local learning model within the learning model store (206). Further, one of ordinary skill will appreciate that the local learning model trainer (204) may perform other functionalities without departing from the scope of the invention.

In one embodiment of the invention, a learning model may generally refer to a machine learning and/or artificial intelligence algorithm configured for classification or prediction applications. A learning model may further encompass any learning algorithm capable of self-improvement through the processing of sample data, which may also be referred to as a supervised learning algorithm Examples of a learning model may include, but are not limited to, a neural network, a decision tree, and a random forest. Furthermore, a local learning model (as referred to herein) may entail a learning model that may be optimized on, at, and/or by a local node (200) using local domain data. On the contrary, a remote learning model (as referred to herein) may alternatively entail a learning model that may be optimized on, at, and/or by a remote node (not shown) using remote domain data.

In one embodiment of the invention, a learning model may be defined by its learning state, which may refer to one or more factors pertinent to the automatic improvement (or "learning") of the learning model through experience—e.g., through iterative optimization using various sample training and/or validation data (i.e., supervised learning). The aforementioned factor(s) may differ depending on the design, configuration, and/or operation of the learning model. For example, for a learning model reflective of a neural network, the factor(s) may include: weights representative of the connection strengths between pairs of nodes structurally defining the neural network; weight gradients representative of the changes or updates applied to the weights during optimization based on an output error of the neural network; and a weight gradients learning rate defining the speed at which the neural network updates the weights.

In one embodiment of the invention, the learning model store (206) may refer to physical data storage (or logical data storage occupying at least a portion of the physical data storage) on a node (200), where one or more sets of learning models (or learning states thereof) may be consolidated. That is, for any given problem statement where a classification or prediction is sought, the learning model store (206) may maintain a trained local learning model (produced on the node (200)) and at least one trained remote learning model (produced on and shared by at least one remote node, respectively). The trained local learning model and the at least one trained remote learning model may or may not be of the same machine learning paradigm (e.g., neural network, decision tree, random forest, etc.). Further, the learning model store (206) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the node network interface (208) may refer to networking hardware (e.g., network card or adapter), a logical interface, an interactivity protocol, or any combination thereof, which may be responsible for facilitating communications between a node (200) and one or more other (remote) nodes via a network. To that extent, the node network interface (208) may include functionality to: obtain a trained local learning model (from the learning model store (206) or the learning model trainer (204)) and a trained local generator model (from the generator model store (216) or the local GAN trainer (214)); transmit, via the network, the trained local learning model and the trained local generator model to one or more other (remote) nodes, where the other node(s) may be collaborating with the node (200) to conduct a multiparty computation; receive at least one trained remote learning model and at least one trained remote generator model, via the network, from the at least one other (remote) node, respectively;

provide or maintain the trained remote learning model(s) and the trained remote generator model(s) to/on the learning model store (206) and the generator model store (216), respectively; and assist the multiparty computation manager (210) in performing its respective functionalities (described below), which may be contingent on secure or private communications amongst the other (remote), collaborating node(s). Further, one of ordinary skill will appreciate that the node network interface (208) may perform other functionalities without departing from the scope of the invention.

In one embodiment of the invention, the multiparty computation manager (210) may refer to a computer program that may execute on the underlying hardware of a node (200), which may be responsible for implementing private set intersection (PSI). PSI may refer to a privacy-preserving, cryptographic multiparty computation protocol through which multiple parties may ascertain the intersection amongst their respective data sets without exposing their respective data sets to the other, collaborating party (parties). PSI is a well-known technique—operational details of which will not be elaborated upon within this disclosure. To the aforementioned extent, the multiparty computation manager (210) may include functionality to: exercise PSI, in conjunction with one or more other (remote) nodes, to identify one or more common features (see e.g., FIG. 3) and one or more common sample IDs (see e.g., FIG. 3) exhibited across the varying data sets respective to the node (200) and the other (remote) node(s). Further, one of ordinary skill will appreciate that the multiparty computation manager (210) may perform other functionalities without departing from the scope of the invention.

In one embodiment of the invention, the local domain database (212) may refer to physical data storage (or logical data storage occupying at least a portion of the physical data storage) on a node (200), where local domain data may be consolidated. Local domain data may entail a collection of structured or tabular data pertinent to a given industry or sector (i.e., domain) (e.g., government, education, healthcare, etc.) to which the node (200) may belong. Local domain data is described in further detail with respect to FIG. 3. Further, the local domain database (212) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the local GAN trainer (214) may refer to a computer program that may execute on the underlying hardware of a node (200), which may be responsible for configuring local GANs (described below). To that extent, the local GAN trainer (214) may include functionality to: receive a set of common features from the node orchestrator (202); retrieve a local domain data subset (maintained in the local domain database (212)) mapped to the received set of common features (i.e., a local generator model training data set); retrieve the local domain data (in entirety or any subset of samples thereof) (i.e., a local discriminator model training data set); initialize/train a local GAN using the local generator model and local discriminator model training data sets; following said training, produce a trained local GAN encompassing or defined through a trained local generator model and a trained local discriminator model; extract the trained local generator model from the trained local GAN; and maintain the trained local generator model within the generator model store (216). Further, one of ordinary skill will appreciate that the local GAN trainer (214) may perform other functionalities without departing from the scope of the invention.

In one embodiment of the invention, a GAN may generally refer to an algorithmic architecture that pits two learning models against one another in order to generate or synthesize data that can be passed off as real data. The aforementioned two learning models may or may not be of the same machine learning paradigm (e.g., neural networks, decision trees, random forests, etc.). Further, one of the learning models may be referred to as a generator model, while the other of the learning models may be referred to as a discriminator model. The objective of the generator model, through training and inference, may be to synthesize near-real remote domain data on/by the node (200) as if the synthesized remote domain data had originated from a respective collaborating remote node. Meanwhile, the objective of the discriminator model, through training, may be to authenticate the synthesized remote domain data in comparison to samples of real remote domain data. Post-training, a trained GAN (including a trained generator model and a trained discriminator model) may be produced, where the former may be optimally configured to generate synthesized remote domain data from an often lesser dimensional input data set. The GAN is a well-known machine learning technique—operational details of which will not be elaborated upon within this disclosure.

In one embodiment of the invention, the generator model store (216) may refer to physical data storage (or logical data storage occupying at least a portion of the physical data storage) on a node (200), where one or more sets of generator models (or learning states thereof) may be consolidated. That is, for any given collaborative problem statement where a classification or prediction is sought, the generator model store (216) may maintain a trained local generator model (produced on the node (200)) and at least one trained remote generator model (produced on and shared by at least one remote node, respectively). The trained local generator model and the at least one trained remote generator model may or may not be of the same machine learning paradigm (e.g., neural network, decision tree, random forest, etc.). Further, the generator model store (216) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the inference aggregator (218) may refer to a computer program that may execute on the underlying hardware of a node (200), which may be responsible for producing aggregate classifications or predictions pertinent to a given problem statement or inquiry. To that extent, the inference aggregator (218) may include functionality to: receive new local domain data (i.e., a new data sample) from the node orchestrator (202); process the new data sample, in entirety, through a trained local learning model to produce a local model outcome (reflective of either a classification or a prediction); extract a subset of the new local domain data (i.e., a new data sample subset), which may map to a set of common features (identified by the multiparty computation manager (210)); process the new data sample subset through each of at least one trained remote generator model (associated with at least one collaborating remote node, respectively) to produce at least one new data sample that can pass for new remote domain data (i.e., at least one synthesized new data sample), respectively; process the synthesized new data sample(s) through their respective trained remote learning model(s) to produce at least one remote model outcome (i.e., classification or prediction); generate an aggregate classification or prediction from processing of the local model outcome and each of the remote model outcome(s) through a local ensemble learning model (described below); and provide the generated aggregate classification/prediction to the node orchestrator (202). Further, one of ordinary skill will appreciate that the inference aggregator (218) may perform other functionalities without departing from the scope of the invention.

In one embodiment of the invention, a local ensemble learning model may generally refer to a machine learning and/or artificial intelligence algorithm configured to aggregate the model outcomes of two or more learning models. Through said aggregation, a single aggregated model outcome (or aggregated outcome) (e.g., either an aggregated classification or an aggregated prediction) may be produced, which may stand as a better model outcome than that which may be produced by the best individual learning model. Further, the local ensemble learning model may implement one or more of any existing ensemble learning techniques—examples of which may include, but are not limited to, hard voting classification; averaging; weighted averaging; stacking; bagging and pasting; and boosting. These techniques are well-known ensemble learning (or outcome aggregation) techniques—operational details of which will not be elaborated upon within this disclosure.

While FIG. 2 shows a configuration of subcomponents, other node (200) configurations may be used without departing from the scope of the invention.

Figure 3:
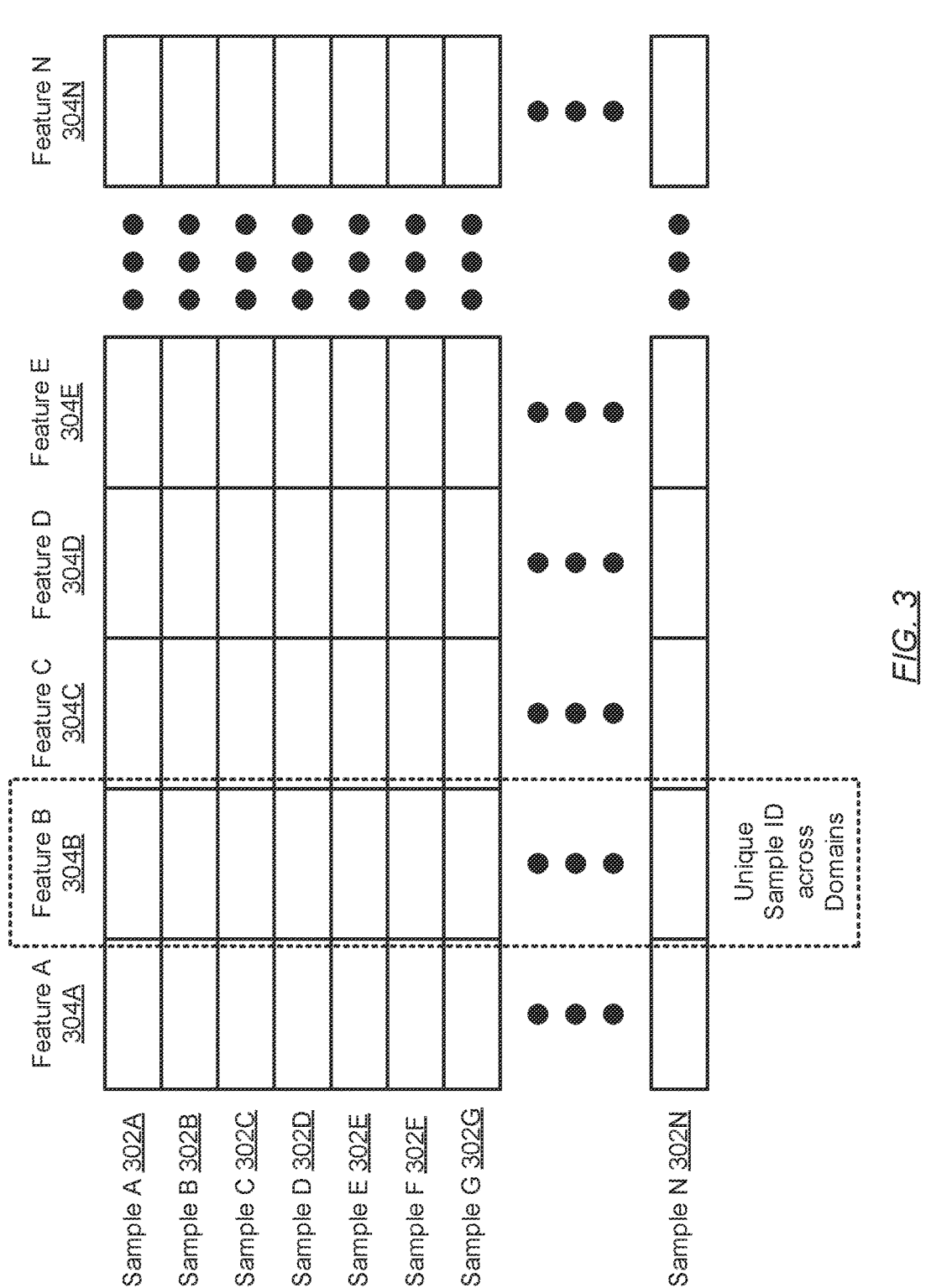
FIG. 3 shows local domain data in accordance with one or more embodiments of the invention.

FIG. 3 shows local domain data in accordance with one or more embodiments of the invention. As briefly mentioned above, local domain data (300) may entail a collection of structured or tabular data pertinent to a given industry or sector (i.e., domain) (e.g., government, education, healthcare, etc.) to which its host node may belong. The local domain data (300), accordingly, may be defined through a combination of one or more samples (302A-302N) and one or more features (304A-304N). Each of these local domain data (300) aspects is described below.

In one embodiment of the invention, a data sample (or sample) (302A-302N) may refer to a tuple, a vector, or a finite ordered list (or sequence) of elements, which may reflect upon or be representative of an entity for which data may be recorded. The nature of the entity may depend on the domain with which the local domain data (300) may be associated. For example, under a healthcare domain, the entity may be representative of an individual person or patient; whereas, under a department of motor vehicles domain, the entity may be representative of a motorized vehicle. Further, a sample (302A-302N) may include a collection of data values—each appropriately describing the entity with respect to a particular feature (304A-304N). Each data value may implemented through a numerical value, a categorical value, a Boolean value, or any other data type value depending on the nature of its respective feature (304A-304N). In the presented illustration, a sample (302A-302N) may reference a row of the local domain data (300).

In one embodiment of the invention, a data feature (or feature) (304A-304N) may refer to a tuple, a vector, or a finite ordered list (or sequence) of elements, which may reflect upon or be representative of a measurable property or attribute. The nature of the measurable property/attribute may depend on and may be relevant or significant to the domain with which the local domain data (300) may be associated. For example, under a healthcare domain, the measurable properties or attributes may include, but are not limited to, blood type, patient age, lifestyle choices (e.g., smoker, drinker, substance user, etc.), genetic information, vaccinations, etc. By way of another example, under a department of motor vehicles domain, the measurable properties or attributes may include, but are not limited to, mileage, exterior color, interior color, engine size, manufacturing year, license plate number, etc. Further, as a collective, the features (304A-304N) may be referred to herein as a feature set or a feature space. In the presented illustration, a feature (304A-304N) may reference a column of the local domain data (300).

In one embodiment of the invention, at least one feature (304A-304N) (i.e., any subset of the feature space) may pertain to a measurable property or attribute that may uniquely identify any entity (or effectively, any sample (302A-302N)) recorded in the local domain data (300). The at least one feature (304A-304N), however, may reference a measurable property or attribute that reflects universally unique entity/sample identification information captured across the varying domains to which the different, collaborating nodes belong. For example, under a healthcare domain, where each entity/sample (302A-302N) of the local domain data (300) represents an individual person or patient, an appropriate entity/sample identifying feature (304A-304N) may reference the social security number or government ID number assigned to the individual person or patient. By way of another example, under a department of motor vehicles domain, where each entity/sample (302A-302N) of the local domain data (300) represents a motorized vehicle, an appropriate entity/sample identifying feature (304A-304N) may reference the vehicle identification number (VIN) assigned to the motorized vehicle.

Figure 4:
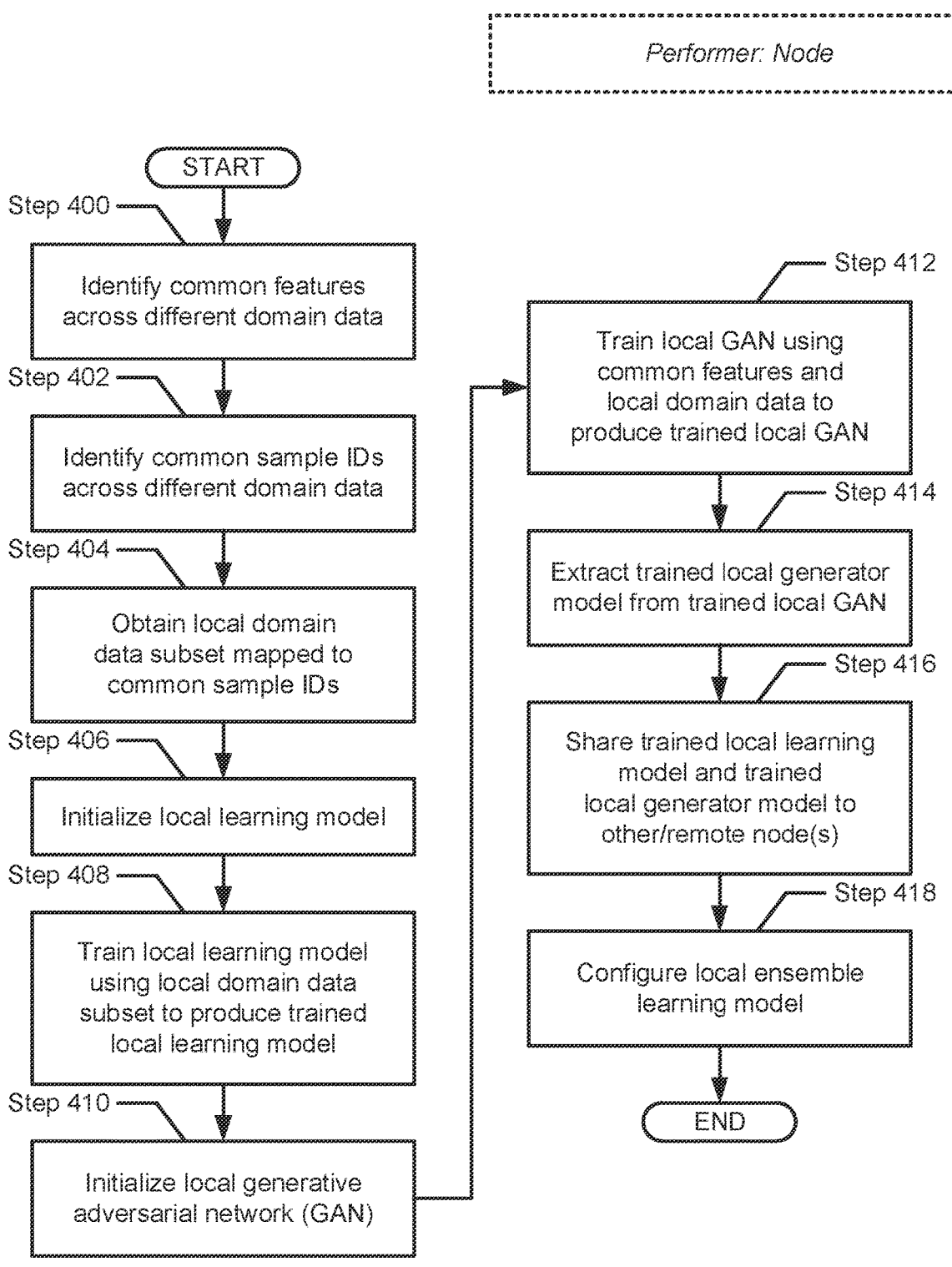
FIG. 4 shows a flowchart describing a method for training models under superseded federated learning in accordance with one or more embodiments of the invention.

FIG. 4 shows a flowchart describing a method for training models under superseded federated learning in accordance with one or more embodiments of the invention. The various steps outlined below may be performed by any node (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a set of common features is identified. In one embodiment of the invention, the common feature(s) may pertain to an intersection, of varying feature sets or spaces, that may be shared amongst two or more collaborating nodes. Identification of the common feature(s) may entail the implementation of private set intersection (PSI) between the collaborating nodes. PSI may refer to a privacy-preserving, cryptographic multiparty computation protocol through which multiple parties may ascertain the intersection amongst their respective data sets without exposing their respective data sets to the other, collaborating party (parties). Further, in order to identify the common feature(s), PSI may be applied to varying feature space vectors—each reflective of the feature space defining the local domain data maintained on a different collaborating node.

For example, in a two-party collaboration scenario, the feature space vector associated with a first node and the government domain may reflect the following structure: [Feature 1 Name; Feature 2 Name; Feature 3 Name; Feature 4 Name], whereas the feature space vector associated with a second node and the healthcare domain may alternatively reflect the following structure: [Feature 5 Name; Feature 3

Name; Feature 6 Name; Feature 1 Name; Feature 7 Name; Feature 8 Name]. As portrayed by their respective feature space vector, each node hosts local domain data defined through mostly different (and yet slightly overlapping) feature spaces. Through PSI, either one or both nodes may ascertain the intersection of these two feature space vectors through cryptographic means, which would identify the common feature(s), at least in a vector structure, as any combination of [Feature 1 Name; Feature 3 Name]. The order of the identified common feature(s), as listed or presented to any node, may hold minimal significance. The common feature(s), at least in this example, may reflect features (pertinent to recorded samples or entities—e.g., people) shared across the government and healthcare domains, such as: social security number, date of birth or age, gender, etc.

In Step 402, a set of common sample identifiers (IDs) is identified. In one embodiment of the invention, the common sample ID(s) may pertain to an intersection, of varying data samples, that may be shared amongst two or more collaborating nodes. Similar to the common feature(s) (identified in Step 400), identification of the common sample ID(s) may entail the implementation of PSI between the collaborating nodes. Further, in order to identify the common sample ID(s), PSI may be applied to varying feature value vectors—each constrained to a single feature in each different feature space defining the local domain data maintained on a different collaborating node, where the single feature may capture universally unique identification information for a data sample (or entity reflective thereof).

For example, the single feature, to which the feature value vectors may be constrained, may represent one of the common feature(s) (identified in Step 400). That is, of the identified common feature(s) amongst local domain data pertaining to each of the collaborating nodes, it may be assumed that at least one common feature reflects data values that may assign a universally unique ID (e.g., a social security number, a vehicle identification number, etc.) to recorded samples or entities (e.g., people, vehicles, etc.) within the varying local domain data sets.

In view of this, in a two-party collaboration scenario, consider that the feature value vector associated with a first node and the government domain may reflect the following structure: [Feature 4 Value 1; Feature 4 Value 2; Feature 4 Value 3; Feature 4 Value 4] (where Feature 4 is identified as a common feature reflective of unique identification information within the local domain data of the first node), whereas the feature value vector associated with a second node and the healthcare domain may alternatively reflect the following structure: [Feature 2 Value 5; Feature 2 Value 1; Feature 2 Value 2; Feature 2 Value 6; Feature 2 Value 4; Feature 2 Value 7] (where Feature 2 is identified as the common feature reflective of unique identification information within the local domain data of the second node). As portrayed by their respective feature value vectors, each node hosts local domain data defined through mostly different (and yet slightly overlapping) feature values constrained to a single feature. Through PSI, either one or both nodes may ascertain the intersection of these two feature value vectors through cryptographic means, which would identify the common sample ID(s), at least in a vector structure, as any combination of [Value 1; Value 2; Value 4]. The order of the identified common sample ID(s), as listed or presented to any node, may hold minimal significance.

In Step 404, a local domain data subset is obtained. In one embodiment of the invention, the local domain data subset may encompass a sub-structure of the local domain data that includes sample(s) mapped to (or associated with) the common sample ID(s) (identified in Step 402), respectively. The local domain data subset, accordingly, may be obtained through the selection of one or more samples, within the local domain data (see e.g., FIG. 3), where each selected sample may include one of the common sample ID(s). Further, as mentioned briefly above, the local domain data subset may also be referred to herein as a local learning model training data set.

In Step 406, a local learning model is initialized. In one embodiment of the invention, the local learning model may represent a machine learning and/or artificial intelligence algorithm configured for classification or prediction applications. Examples of the local learning model may include, but are not limited to, a neural network, a decision tree, and a random forest. Further, the local learning model may be characterized or defined by its learning state, which may refer to one or more factors pertinent to the automatic improvement (or "learning") of the local learning model through experience—e.g., through iterative optimization using various sample data—otherwise referred to as supervised learning. Initialization of the local learning model, moreover, may entail configuring said learning state (including the parameters and/or hyper-parameters) of the local learning model with respective default values.

In Step 408, the local learning model (initialized in Step 406) is subsequently trained using the local domain data subset (i.e., local learning model training data set) (obtained in Step 404). In one embodiment of the invention, said training may entail iterative adjustments to the learning state of the local learning model until the local learning model training data set is exhausted, a threshold number of training runtimes (or epochs) is reached, or an acceptable performance condition (e.g., threshold accuracy, threshold convergence, etc.) is met. Further, following said training, a trained local learning model may be produced, which may be defined through local domain data subset adjusted learning state representative of learning state optimized based on (or using) the local learning model training data set.

In Step 410, a local generative adversarial network (GAN) is initialized. In one embodiment of the invention, the local GAN may generally refer to an algorithmic architecture that pits two learning models against one another in order to generate or synthesize data that can be passed off as real data. These pair of learning models may include a local generator model and a local discriminator model—each of which may or may not be of the same machine learning paradigm (e.g., neural network, decision tree, random forest, etc.) as the other. Further, the local GAN (through its constituent learning models) may be characterized or defined by their combined learning state (described above). Accordingly, initialization of the local GAN may entail configuring said combined learning state (including the parameters and/or hyper-parameters) of the both the local generator and the local discriminator models with respective default values.

In Step 412, the local GAN (initialized in Step 410) is subsequently trained using two data sets—a first data set (i.e., a local discriminator model training data set) including the various samples of the local domain data (reflective of the entirety of the feature space thereof); and a second data set (i.e., a local generator model training data set) including a sub-structure of the local domain data that includes sample(s) mapped to (or associated with) the common features(s) (identified in Step 400), respectively. In one embodiment of the invention, the local generator model training data set, at least, may be obtained through the dimensional reduction of the local domain data (see e.g., FIG. 3) such that all samples reflect only a subset of the local feature space—mainly, just the one or more features matching the common feature(s). Furthermore, training of the local GAN may entail iterative adjustments to the learning state of the local generator model, as well as the learning state of the local discriminator model, until either or both the local discriminator model training data set and/or the local generator model training data set is/are exhausted, a threshold number of training runtimes (or epochs) is reached by either or both the local generator model and/or the local discriminator model, or an acceptable performance condition (e.g., threshold accuracy, threshold convergence, etc.) is met. Moreover, following said training, a trained local GAN (encompassing a trained local generator model and a trained local discriminator model) may be produced, which may be defined through the combined adjusted learning state of the two trained constituent learning models of the trained local GAN.

In one embodiment of the invention, the training of any machine learning algorithm (introduced throughout this disclosure) using one or more data sets may also be referred to herein as optimally configuring said machine learning algorithm(s). That is, for example, training the local generator model using the local generator model training data set may also translate to optimally configuring the local generator model using the aforementioned data set. Further, as described above, the result of training the local generator model yields the trained local generator model.

In Step 414, the trained local generator model (or the optimized learning state thereof), of the trained local GAN (produced in Step 412), is extracted therefrom.

In Step 416, the trained local learning model (produced in Step 408) and the trained local generator model (extracted in Step 414) are shared with or disseminated to each of a set of collaborating remote nodes. Similarly, though not shown in the flowchart, one or more sets of a trained remote learning model and a trained remote generator model may be received from one or more collaborating remote nodes, respectively. In one embodiment of the invention, each trained (local or remote) generator model may be used by the receiving (remote or local) node to synthesize near-real sample or input data reflecting the distribution of data across the feature space of the (local or remote) domain data. On the other hand, each trained (local or remote) learning model may be used by the receiving (remote or local) node to infer a model outcome (e.g., either a classification or a prediction) based on the near-real sample or input data synthesized by a respective trained (local or remote) generator model. Moreover, through said sharing during the presently described training phase, each node may not require active coordination or collaboration with one another throughout the inference phase (see e.g., FIG. 5).

In Step 418, a local ensemble learning model, which may be invoked by an inference aggregator of a node (see e.g., FIG. 2), is configured. In one embodiment of the invention, the local ensemble learning model may generally refer to a machine learning and/or artificial intelligence algorithm configured to aggregate the model outcomes of two or more learning models into a singular, more accurate aggregated model outcome (or aggregated outcome). Configuration of the local ensemble learning model may at least entail selecting and subsequently implementing one or more of any existing ensemble learning techniques—examples of which may include, but are not limited to, hard voting classification; averaging; weighted averaging; stacking; bagging and pasting; and boosting.

Figure 5:
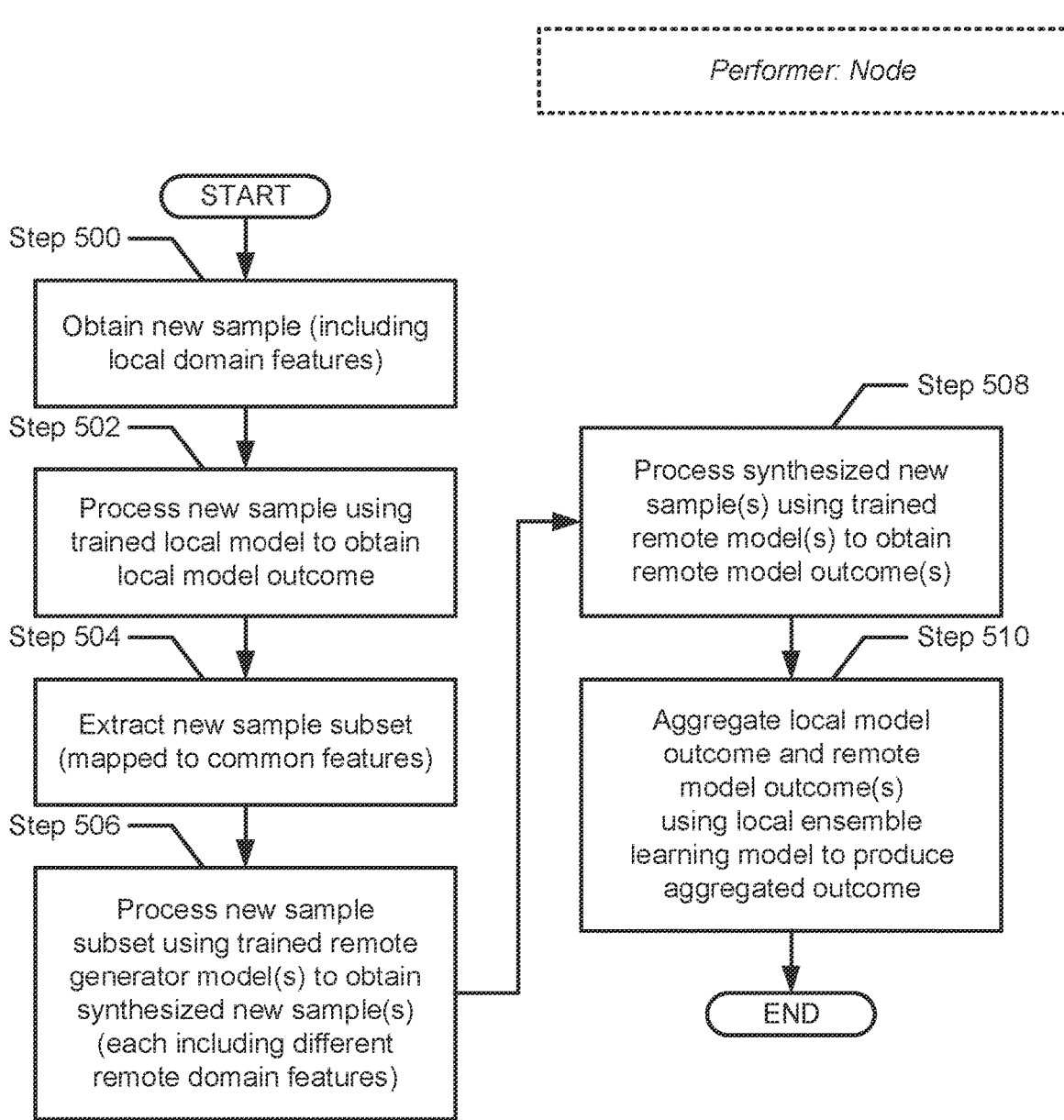
FIG. 5 shows a flowchart describing a method for inferring outcomes under superseded federated learning in accordance with one or more embodiments of the invention.

FIG. 5 shows a flowchart describing a method for inferring outcomes under superseded federated learning in accordance with one or more embodiments of the invention. The various steps outlined below may be performed by any node (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a new data sample (or new sample) is obtained. In one embodiment of the invention, the new sample may refer to a tuple, a vector, or a finite ordered list (or sequence) of elements, which may reflect upon or be representative of a new entity for which data may be recorded. The nature of the new entity may depend on the domain with which the local domain data (see e.g., FIG. 3) may be associated. For example, under a healthcare domain, the new entity may be representative of a new individual person or patient; whereas, under a department of motor vehicles domain, the new entity may be representative of a new motorized vehicle.

In Step 502, the new sample (obtained in Step 500) is processed through or using a trained local learning model (see e.g., FIG. 4). In one embodiment of the invention, the trained local learning model may be optimally configured to infer a local model outcome (e.g., either a classification or a prediction) pertinent to the collaborative problem statement or inquiry, and deterministic given an expected format or structure of ordered input data (i.e., the new sample).

In Step 504, a subset of the new sample (obtained in Step 500) is extracted therefrom to obtain a new sample subset. In one embodiment of the invention, the new sample subset may encompass a portion of the new sample that includes value(s) mapped to (or associated with) a set of common features (see e.g., FIG. 4). The new sample subset, accordingly, may be obtained through the selection of one or more data values, within the new sample, where each selected data value may pertain to one of the common feature(s). Further, the new sample subset may also be referred to herein as a remote generator model input data set.

In Step 506, the new sample subset (i.e., remote generator model input data set) (extracted in Step 504) is processed through or using one or more trained remote generator models (see e.g., FIG. 4). In one embodiment of the invention, each trained remote generator model may be optimally configured to synthesize near-real remote domain data that could be passed off as originating from a given collaborating remote node (when in fact no said remote domain data may ever be shared to preserve data privacy between nodes). Further, following said processing of the remote generator model input data set through each trained remote generator model, a synthesized new sample (respective to a given collaborating remote node) may be obtained. Each synthesized new sample (which may also be referred to herein as a synthesized remote learning model input data set) may thus reflect near-real remote domain data pertaining to the feature space (including the common feature(s)) maintained on a given collaborating remote node.

In Step 508, the synthesized new sample(s) (i.e., synthesized remote learning model input data set(s)) (obtained in Step 506) is/are processed through or using one or more trained remote learning models, respectively. In one embodiment of the invention, each trained remote learning model may be optimally configured to infer a remote model outcome (e.g., either a classification or a prediction) pertinent to the collaborative problem statement or inquiry, and deterministic given an expected format or structure of ordered input data (i.e., a synthesized remote learning model input data set). Furthermore, each trained remote learning model may be matched to a given synthesized remote learning model input data set—both of which may be relevant to (or associated with) a given collaborating remote node.

In Step 510, the local model outcome (obtained in Step 502) and the remote model outcome(s) (obtained in Step 508) are aggregated. Particularly, in one embodiment of the invention, aggregation of the local and remote model outcomes may entail processing of the local and remote model outcomes through or using a local ensemble learning model (see e.g., FIG. 4). The local ensemble learning model, in turn, may achieve said aggregation through the implementation of one or more existing ensemble learning techniques—examples of which may include, but are not limited to, hard voting classification; averaging; weighted averaging; stacking; bagging and pasting; and boosting. Further, following said aggregation, an aggregated model outcome (or aggregated outcome)—entailing either an aggregated classification or an aggregated prediction—may be produced.

Figure 6:
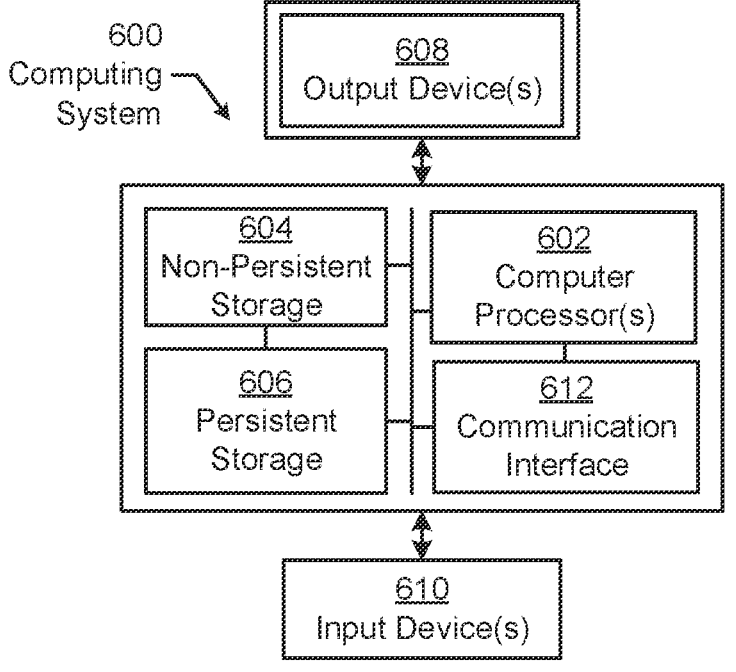
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for inferring outcomes using superseded federated learning on a system, the method comprising:

identifying, on a node of a plurality of nodes of the system, a set of common features of data sets stored on different nodes of a plurality of nodes by implementing a private set intersection (PSI) between the plurality of nodes to ascertain an intersection of the data sets of the different nodes without exposing respective data sets of the different nodes to other nodes;

identifying a set of common sample identifiers (IDs) based on a common feature of the set of common features, wherein the PSI is applied to varying feature value vectors, representing the common feature of the set of common features, to identify the set of common sample IDs;

obtaining a local domain dataset mapped to the set of common sample IDs, wherein the local domain dataset is a portion of the local domain data and wherein the local domain data comprises data of the node;

initializing, after obtaining the local domain dataset, a local learning model by configuring a learning state with respective default values;

producing a trained local learning model from the local learning model by training on the local domain dataset, wherein training entails iterative adjustments to the learning state until an acceptable performance condition is reached;

initializing, after producing the trained local learning model, a local generative adversarial network (GAN), wherein the local GAN comprises a local generator model and a local discriminator model and wherein the local generator model and the local discriminator model are pit against each other to generate synthetic data;

producing a trained local GAN from the local GAN based on a local generator model training data set and a local discriminator model training data set, wherein the local generator model training set comprises the data of the node mapped to the set of common features and wherein the local discriminator model training data set comprises second data sampled from the local domain data;

extracting a trained local generator model from the trained local GAN;

sharing the trained local generator model and the local learning model with at least one other remote node of the plurality of nodes via a network, wherein the at least one other remote node is separate from the node;

receiving, after sharing and from the at least one other remote node of the system, one or more trained remote generator models and one or more trained remote learning models via the network;

after receiving the one or more trained remote generator models and the one or more trained remote learning models:

obtaining a new sample at the node of the system;

processing the new sample using the trained local learning model to obtain a local model outcome;

deriving a remote generator model input data set from the new sample;

processing the remote generator model input data set using the one or more trained remote generator models of the plurality of nodes to obtain at least one synthesized remote learning model input data set, wherein the at least one synthesized remote learning model input data set is created to simulate sample data from separate nodes of the plurality of nodes;

processing the at least one synthesized remote learning model input data set using the one or more trained remote learning models on the node to obtain at least one remote model outcome; and aggregating the local model outcome and the at least one remote model outcome using a local ensemble learning model of the node to produce an aggregated outcome, wherein the local ensemble learning model comprises a machine learning model configured to aggregate the local model outcome and the at least one remote model outcome using an ensemble learning technique.

2. The method of claim 1, wherein the new sample comprises an ordered list of data values mapped, respectively, to a feature space relevant to a local domain.

3. The method of claim 2, wherein the feature space comprises a set of common features also exhibited in at least another feature space relevant to at least one remote domain.

4. The method of claim 3, wherein the remote generator model input data set comprises a subset of the new sample, wherein the subset of the new sample comprises a subset of the ordered list of data values mapped to the set of common features.

5. The method of claim 3, wherein the at least one synthesized remote learning model input data each comprises an ordered list of data values mapped, respectively, to the at least another feature space relevant to the at least one remote domain.

6. The method of claim 1, wherein the common feature reflects identification information uniquely identifying a set of entities, wherein local domain data pertinent to a local domain comprises data for the set of entities.

7. The method of claim 6, wherein the common feature further reflects identification information uniquely identifying at least another set of entities, wherein remote domain data pertinent to at least one remote domain comprises data for the at least another set of entities.

8. The method of claim 6, wherein the local learning model training data set comprises a subset of the local domain data, wherein the subset of the local domain data comprises a subset of samples mapped to the set of common sample IDs.

9. The method of claim 1, wherein the trained local generator model results from optimally configuring a local generator model using the local generator model training data set, wherein the trained local discriminator model results from optimally configuring a local discriminator model using the local discriminator model training data set.

10. A non-transitory computer readable medium (CRM) comprising computer readable program code, which when executed by a computer processor, enables the computer processor to perform a method for inferring outcomes using superseded federated learning on a system, the method comprising:

identifying, on a node of a plurality of nodes of the system, a set of common features of data sets stored on different nodes of a plurality of nodes by implementing a private set intersection (PSI) between the plurality of nodes to ascertain an intersection of the data sets of the different nodes without exposing respective data sets of the different nodes to other nodes;

identifying a set of common sample identifiers (IDs) based on a common feature of the set of common features, wherein the PSI is applied to varying feature value vectors, representing the common feature of the set of common features, to identify the set of common sample IDs;

obtaining a local domain dataset mapped to the set of common sample IDs, wherein the local domain dataset is a portion of the local domain data and wherein the local domain data comprises data of the node;

initializing, after obtaining the local domain dataset, a local learning model by configuring a learning state with respective default values;

producing a trained local learning model from the local learning model by training on the local domain dataset, wherein training entails iterative adjustments to the learning state until an acceptable performance condition is reached;

initializing, after producing the trained local learning model, a local generative adversarial network (GAN), wherein the local GAN comprises a local generator model and a local discriminator model and wherein the local generator model and the local discriminator model are pit against each other to generate synthetic data;

producing a trained local GAN from the local GAN based on a local generator model training data set and a local discriminator model training data set, wherein the local generator model training set comprises the data of the node mapped to the set of common features and wherein the local discriminator model training data set comprises second data sampled from the local domain data;

extracting a trained local generator model from the trained local GAN;

sharing the trained local generator model and the local learning model with at least one other remote node of the plurality of nodes via a network, wherein the at least one other remote node is separate from the node;

receiving, after sharing and from the at least one other remote node of the system, one or more trained remote generator models and one or more trained remote learning models via the network;

after receiving the one or more trained remote generator models and the one or more trained remote learning models:

obtaining a new sample at the node of a system;

processing the new sample using the trained local learning model to obtain a local model outcome;

deriving a remote generator model input data set from the new sample;

processing the remote generator model input data set using the one or more trained remote generator models of the plurality of nodes to obtain at least one synthesized remote learning model input data set, wherein the at least one synthesized remote learning model input data set is created to simulate sample data from separate nodes of the plurality of nodes processing the at least one synthesized remote learning model input data set using the one or more trained remote learning models on the node to obtain at least one remote model outcome; and aggregating the local model outcome and the at least one remote model outcome using a local ensemble learning model of the node to produce an aggregated outcome, wherein the local ensemble learning model comprises a machine learning model configured to aggregate the local model outcome and the at least one remote model outcome using an ensemble learning technique.

11. A system, comprising:

a plurality of nodes operatively connected to one another through a network, wherein each node of the plurality of nodes comprises a computer processor configured to perform a method for inferring outcomes using superseded federated learning, the method comprising:

identifying a set of common features of data sets stored on different nodes of the plurality of nodes by implementing a private set intersection (PSI) between the plurality of nodes to ascertain an intersection of the data sets of the different nodes without exposing respective data sets of the different nodes to other nodes;

identifying a set of common sample identifiers (IDs) based on a common feature of the set of common features, wherein the PSI is applied to varying feature value vectors, representing the common feature of the set of common features, to identify the set of common sample IDs;

obtaining a local domain dataset mapped to the set of common sample IDs, wherein the local domain dataset is a portion of the local domain data and wherein the local domain data comprises data of the node;

initializing, after obtaining the local domain dataset, a local learning model by configuring a learning state with respective default values;

producing a trained local learning model from the local learning model by training on the local domain dataset, wherein training entails iterative adjustments to the learning state until an acceptable performance condition is reached;

initializing, after producing the trained local learning model, a local generative adversarial network (GAN), wherein the local GAN comprises a local generator model and a local discriminator model and wherein the local generator model and the local discriminator model are pit against each other to generate synthetic data;

producing a trained local GAN from the local GAN based on a local generator model training data set and a local discriminator model training data set, wherein the local generator model training set comprises the data of the node mapped to the set of common features and wherein the local discriminator model training data set comprises second data sampled from the local domain data;

extracting a trained local generator model from the trained local GAN;

sharing the trained local generator model and the local learning model with at least one other remote node of the plurality of nodes via a network, wherein the at least one other remote node is separate from the node;

receiving, after sharing and from the at least one other remote node of the system, one or more trained remote generator models and one or more trained remote learning models via the network;

after receiving the one or more trained remote generator models and the one or more trained remote learning models;

obtaining a new sample;

processing the new sample using the trained local learning model to obtain a local model outcome;

deriving a remote generator model input data set from the new sample;

processing the remote generator model input data set using the one or more trained remote generator models of the plurality of nodes to obtain at least one synthesized remote learning model input data set, wherein the at least one synthesized remote learning model input data set is created to simulate sample data from separate nodes of the plurality of nodes;

processing the at least one synthesized remote learning model input data set using the one or more trained remote learning models on the node to obtain at least one remote model outcome; and aggregating the local model outcome and the at least one remote model outcome using a local ensemble learning model of the node to produce an aggregated outcome, wherein the local ensemble learning model comprises a machine learning model configured to aggregate the local model outcome and the at least one remote model outcome using an ensemble learning technique.

\* \* \* \* \*